(No Model.)
F. HULSE.
GRUB CATCHER.
No. 355,087. Patented Dec. 28, 1886.
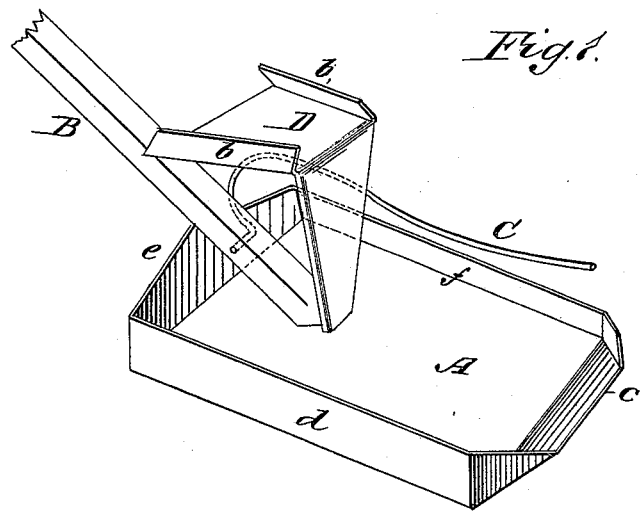
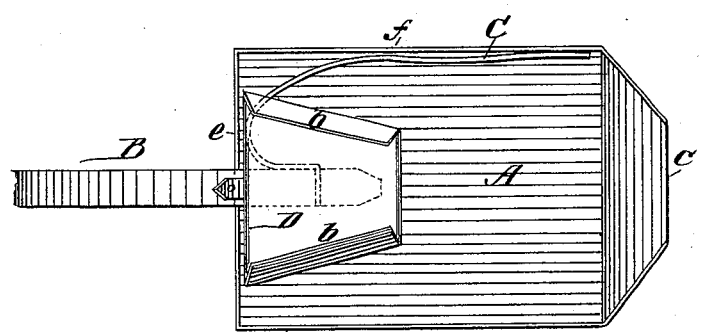
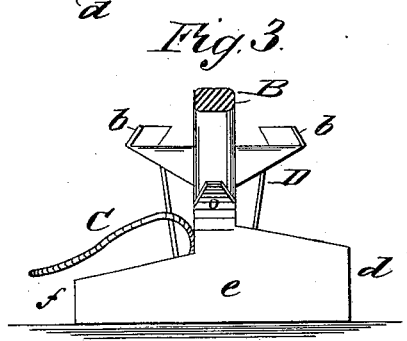
WITNESSES:
INVENTOR:
F. Hulse
BY Munn & Co.
ATTORNEYS.

UNITED STATES PATENT OFFICE.

FRANK HULSE, OF GOSHEN, NEW YORK.

GRUB-CATCHER.

SPECIFICATION forming part of Letters Patent No. 355,087, dated December 28, 1886.

Application filed October 21, 1886. Serial No. 216,864. (No model.)

*To all whom it may concern:*

Be it known that I, FRANK HULSE, of Goshen, in the county of Orange and State of New York, have invented new and useful Improvements in Grub-Catchers, of which the following is a full, clear, and exact description.

This invention relates to insect and grub catchers in scoop form for use on growing plants, and is more particularly designed for removing grubs from onions while growing.

The invention consists in a novel device for this purpose, which is automatic in the performance of its work as it is moved over the ground, the same including certain constructions and combinations of parts, substantially as hereinafter described, and pointed out in the claims.

Reference is to be had to the accompanying drawings, forming a part of this specification, in which similar letters of reference indicate corresponding parts in all the figures.

Figure 1 is a view in perspective of a grub-catcher embodying my invention, with the handle partly broken away. Fig. 2 is a plan view of the same, and Fig. 3 a rear end view thereof.

A is the pan or body of the implement, made of sheet metal or any other suitable material, and of proper construction on its base to run upon or slide over the ground, said pan being provided with a long handle, B, in its rear, whereby it may be pushed over the ground between the rows of growing onions or plants.

C is a wire spring secured at its inner end within and over the body of the pan, and freely running or inclined outward in front beyond and over the left-hand side of the pan, so that it will pass or project to the left side of the left-hand row of onions as the implement is pushed along between two rows. The spring C, thus arranged, operates as a hand or finger to bend or turn the onion-plants toward the pan and to knock the grubs into the latter.

A lantern-stand, D, is erected over the rear portion of the pan, of a wedge shape in plan view, and with its sides *b b* turned up and over to form ways for the lantern-base to slide into, and whereby the lantern may be readily fitted to and removed from the implement.

When the pan is full of grubs, they can be emptied out of the front end of the pan without removing the lantern.

The front end of the pan is turned up, as shown at *c*, to prevent the escape of grubs and to avoid dirt getting into the pan while shoving the implement along over the ground.

The right-hand side, *d*, and rear side, *e*, of the pan are constructed higher than the left side, *f*, thereof. This provides for the implement carrying an increased quantity of grubs by shaking the grubs over onto the higher side of the pan, while the lower left side, *f*, of the pan provides for working the implement in onions of only small growth.

The implement is light, may be worked by any one capable of hoeing onions, and is readily guided, and sufficient light will be given by the lantern to plainly see the plants. A largely-increased quantity of grubs may be removed by it within a given time over or as compared with picking or removing them by hand, and when the implement is not in use the wire spring C may be sprung inside of the pan, where it will be held by the side *f*, and when lifted up or released will readily fly to its normal position for use.

Having thus described my invention, what I claim as new, and desire to secure by Letters Patent, is—

1. In a grub-catcher, the combination, with the pan A, adapted to slide on and over the ground, of the elastic finger C, secured in its rear and arranged to incline laterally in a forward direction over the one side of the pan, substantially as specified.

2. The combination of the handle B, the pan A, the elastic finger C, secured in its rear and arranged to incline laterally in a forward direction over the one side of the pan, and the lantern-stand D, essentially as described.

3. In a grub-catcher, the pan A, having its front *c* turned up and narrowed, and one side, *f*, of lesser height than its opposite side, *d*, and rear *e*, in combination with the elastic finger C, secured in its rear and arranged to incline laterally in a forward direction over the one side of the pan, substantially as specified.

4. In combination with the pan A, the lantern-stand D, of tapering form on its upper surface, and having its sides $b\ b$ turned upward and inward to clamp the lamp in position, essentially as and for the purpose herein set forth.

FRANK HULSE.

Witnesses:
JOHN B. SWEZEY,
C. W. COLEMAN.